No. 626,142. Patented May 30, 1899.
E. CLAY & J. F. GIBB.
BEARING.
(Application filed Feb. 27, 1899.)

(No Model.)

Witnesses.
A. G. Heysmann.
Geo. H. Evans.

Inventors.
Edwin Clay and John F. Gibb.
by Herbert W. T. Jenner.
Attorney.

UNITED STATES PATENT OFFICE.

EDWIN CLAY AND JOHN FLEMING GIBB, OF SOWERBY BRIDGE, ENGLAND.

BEARING.

SPECIFICATION forming part of Letters Patent No. 626,142, dated May 30, 1899.

Application filed February 27, 1899. Serial No. 707,015. (No model.)

*To all whom it may concern:*

Be it known that we, EDWIN CLAY and JOHN FLEMING GIBB, subjects of the Queen of Great Britain, residing at Sowerby Bridge, in the county of York, England, have invented certain new and useful Improvements in Bearings for Lubricating Shafts, Spindles, and the Like; and we do hereby declare the following to be a full, clear, and exact description of the invention, such as will enable others skilled in the art to which it appertains to make and use the same.

Our invention relates to a new means of lubricating shafting, spindles, and the like.

The invention consists in forming or attaching to the shafts or spindles to be lubricated a double conical boss, fitting into and revolving in almost correspondingly-shaped convex bearings.

In order to illustrate our invention, we have annexed the accompanying sheet of drawings, illustrative thereof, wherein—

Figure 1:
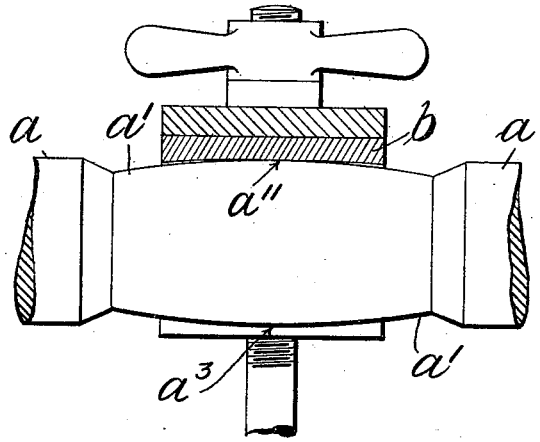
Figure 2:
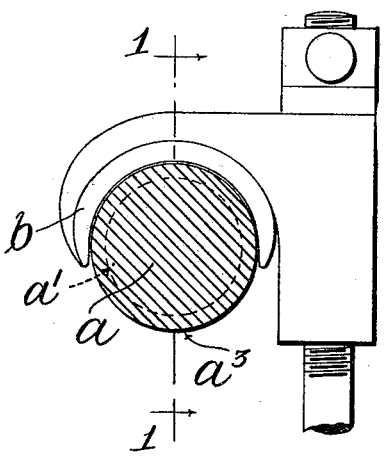
Figure 3:
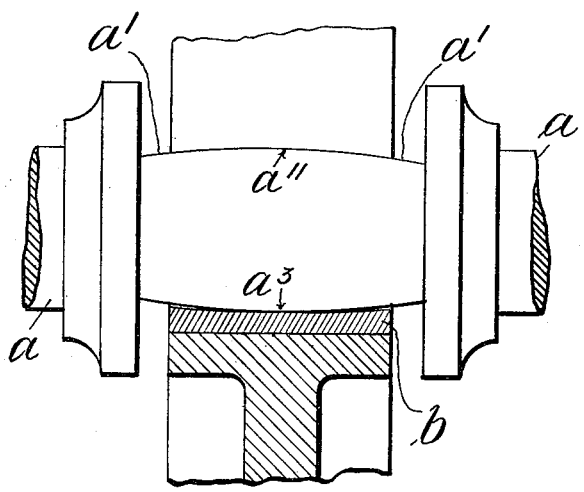
Figure 4:
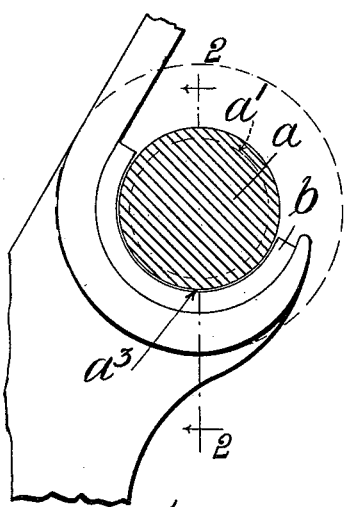

Figure 1 is a sectional elevation taken on line 1 1 of Fig. 2, which is a side elevation of one means of applying our invention; and Fig. 3 is a similar sectional elevation taken on line 2 2 of Fig. 4, showing another means of application.

Referring first to Figs. 1 and 2, which show our improvements applied to a bearing in which the pressure is on the upper surface of the shaft or spindle, letter $a$ represents the shaft or spindle to be lubricated. This shaft or spindle at the point to be lubricated is made double conical, as shown at $a'$. The brass or other antifriction metal is represented at $b$, and it is arranged to come into contact with the shaft only at the central part or largest diameter $a''$ of the double conical portion $a'$.

Figs. 3 and 4 show the application of our improvements to a bearing where the contact is on the under side of the shaft.

When the shaft or spindle is at rest, the oil or other lubricant gravitates toward the part $a^3$, where the pressure comes and lubricant is principally required, and when said shaft commences to rotate the oil still tends to gravitate toward part $a^3$ instead of being thrown out at the ends of the bearing, as hitherto. In practice it is found that the oil gravitates sufficiently to form a slight cushion of lubricant between the shaft or spindle and the antifriction metal, and, further, it is found that the shaft does not require lubricating as frequently as when ordinary forms of bearings are employed.

The bearing is applicable to shafts or spindles of any description whether said shafts or spindles are entirely surrounded by antifriction metal or not.

We claim as our invention—

The combination, with a revoluble shaft provided with a double conical portion larger at the middle portion than at the end portions, of a non-revoluble segment-bearing which is in contact with the said middle portion on one side only and out of contact with the said end portions, whereby the lubricant is free to gravitate to the said middle portion and is discharged onto the bearing as the shaft is revolved, substantially as set forth.

In testimony whereof we affix our signatures in presence of two witnesses.

EDWIN CLAY.
JOHN FLEMING GIBB.

Witnesses:
LOUIS P. FOSTER,
FRANK L. EWIN.